H. M. B. BARY.
WEIGHING SCALE.
APPLICATION FILED APR. 18, 1908.
No. 903,045.
Patented Nov. 3, 1908.
3 SHEETS—SHEET 1.
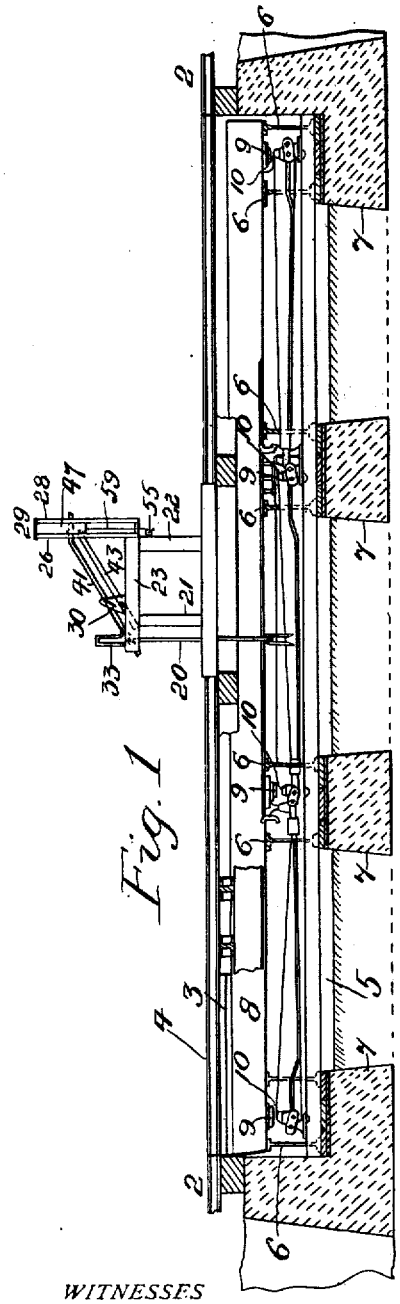
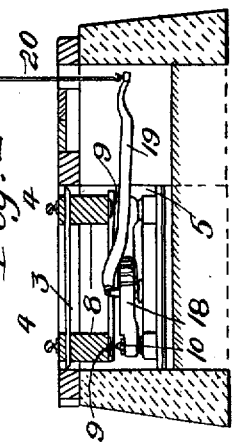
WITNESSES
W. H. Austin.
J. P. Hines.
INVENTOR
Henry M. B. Bary
by Connolly Bro. Attorneys

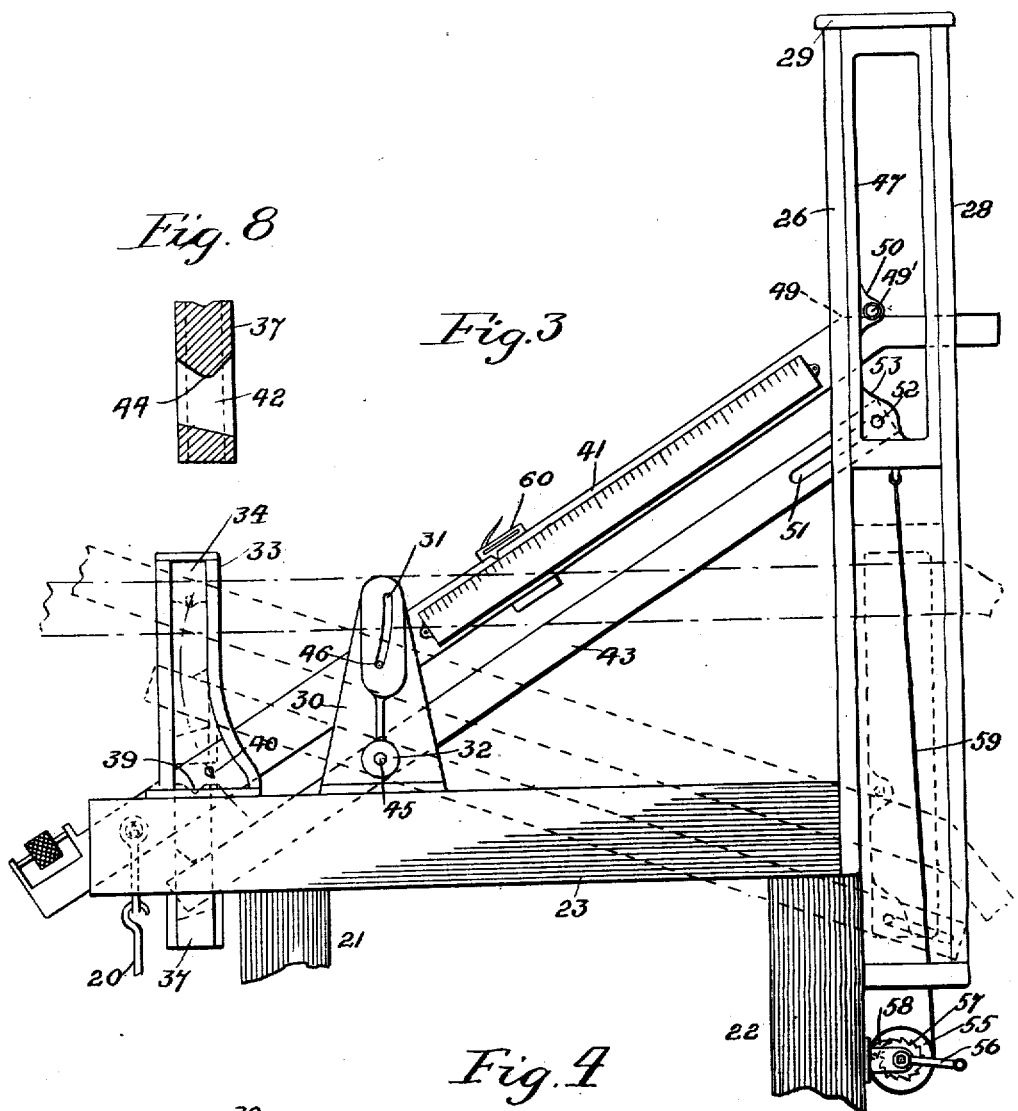

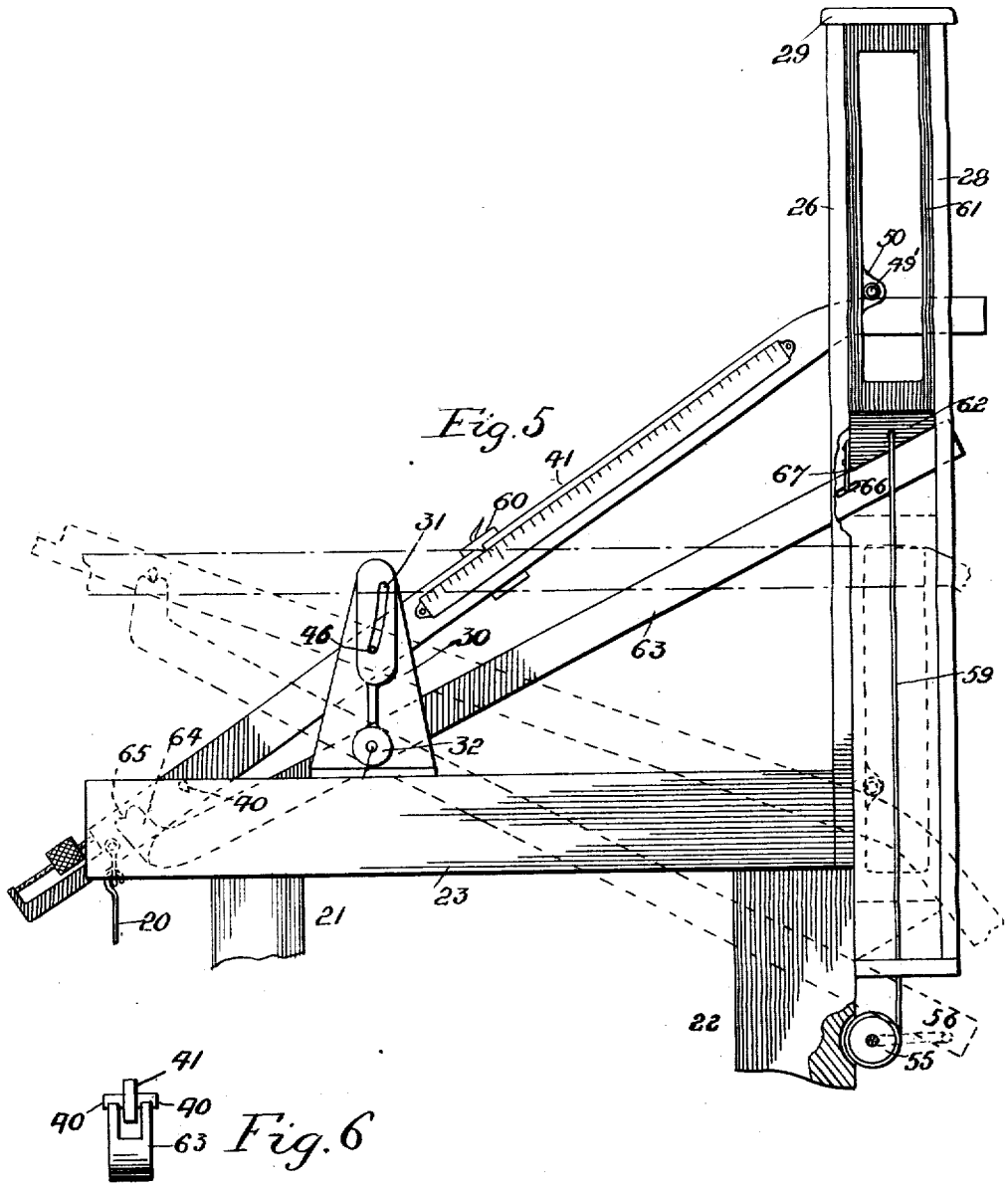

UNITED STATES PATENT OFFICE.

HENRY M. B. BARY, OF PHILADELPHIA, PENNSYLVANIA.

WEIGHING-SCALE.

No. 903,045.

Specification of Letters Patent.

Patented Nov. 3, 1908.

Application filed April 18, 1908. Serial No. 427,928.

*To all whom it may concern:*

Be it known that I, HENRY M. B. BARY, a citizen of the United States, residing at Philadelphia, in the county of Philadelphia and State of Pennsylvania, have invented certain new and useful Improvements in Weighing-Scales, of which the following is a specification.

This invention has relation to weighing scales and relates in particular to platform and track scales and has for its object the provision of novel means for relieving the knife edges and all the other delicate parts of the apparatus from accidental injury and unnecessary friction and consequent wear and loss of accuracy.

My invention consists in the novel constructions, combinations and arrangements of parts hereinafter described and claimed and in carrying my invention into effect, I provide stationary supports for the platform on which it rests while the apparatus is inactive, that is while the platform is being loaded or unloaded, and while the scale is not being used, such supports being so placed relatively to the platform and to the levers of the weighing mechanism that when the platform is resting on the supports, it will be sustained wholly by the same and out of contact with any and all parts of the weighing mechanism. In connection with the stationary supports I provide novel mechanism for bringing the parts of the weighing mechanism which support the platform when it is not sustained by the stationary supports, into and out of contact with the platform, so that alternately and accordingly as the scale is to be rendered active or inactive, the platform will be supported wholly by the stationary supports or wholly by the weighing mechanism.

While in my present invention the movement of the parts of the weighing mechanism below the platform necessary to bring it into and out of contact with the platform is effected by a movement of the scale beam in a vertical direction, analogous to the ordinary movement of the same in weighing scales as heretofore constructed, I do not depend on the ordinary movement of the scale beam, but, by means hereinafter described, I impart two movements to the scale beam in performing the weighing operation, one movement, being the ordinary slight balancing movement employed in the weighing operation proper, and the other a supplementary and greater movement to effect the required engagement and disengagement of the platform and the weighing mechanism.

The supplementary and greater movement of the scale beam above referred to is accomplished by means of two fulcra disposed at different points on the scale beam and brought into action alternately, the scale beam, when sustained on one fulcrum serving to raise and lower the weighing mechanism into and out of contact with the platform and when sustained on the other fulcrum, serving, with its sliding counterpoise, to act in the ordinary and well known manner to weigh the object resting on the platform. The change of fulcra of the scale beam above referred to is accomplished by means of a pivoted lever disposed adjacent to and substantially parallel with the scale beam and carrying a bearing for one of the fulcrums of the scale beam, the other fulcrum of the scale beam being carried on a stationary bearing and the parts being so constructed and arranged and combined with other mechanism as will be hereinafter described, so that by a vertical movement of the pivoted lever and the scale beam, turning on that fulcrum which rests on the stationary bearing, will raise the weighing mechanism into contact with the platform, and, by a continuation of the same movement the scale beam will abandon its previous pivoted point and be fulcrumed on the bearing carried by the pivoted lever, in which last named position it will operate in the ordinary manner and with its sliding weight, serve to accurately weigh the load which has been imposed on the platform.

Referring to the accompanying drawing illustrating my invention: Figure 1 is a vertical longitudinal sectional view of a platform scale constructed according to my invention. Fig. 2 is a vertical transverse sectional view of the same. Fig. 3 is an enlarged front elevation of the scale beam, its supporting framing and appurtenant parts. Fig. 4 is a plan view of the same. Fig. 5 is a view similar to Fig. 3 of a modified form of scale beam and appurtenant parts. Fig. 6 is an end view of the parts shown in Fig. 5. Fig. 7 is a detail view partly in section of a portion of the weighing mechanism below the platform. Fig. 8 is a detail view partly in section of part of the mechanism shown in Fig. 3.

Referring first to the construction shown in Figs. 1 and 2, wherein 1 designates the road bed of a railway and 2 the stationary rails leading to and from the platform 3 of the scales, said platform carrying sections of rails 4, suitably secured to the platform in any desired manner. The platform 3 is mounted over the pit 5 which contains the weighing levers of the scale and the platform is supported while in its inactive position upon I beams 6 resting on solid abutments 7. The platform is of the ordinary construction and includes longitudinal beams 8 which carry on their lower edges a number of contact surfaces 9 which are located over contact surfaces 10 carried by the bearings 11. The bearings 11 rest upon knife edges 12 carried by elbow levers 13 which latter also carries knife edges 14 that rest upon blocks 15, the knife edges 14 forming the fulcrums of said elbow levers. The elbow levers 13 are carried by transversely disposed horizontal rocking rods 16 which latter carry the main levers 17 which have the usual connections 18, 19, 20, with a graduated scale beam hereinafter described.

The construction of the scale beam and its appurtenances will be best understood by reference to Figs. 3, 4, and 8 to which I will now particularly refer.

The supporting frame for the scale beam and the other parts of the mechanism which are preferably disposed above the level of the platform, comprises the standards 21 and 22 carrying the parallel horizontal beams 23, 24, upon which are mounted the four vertical posts or standards 25, 26, 27 and 28 connected together at their top by a cap or plate 29. Upon the top of the beams 23 and 24 are arranged the housings 30, which are provided with curved slots 31 near their upper ends and with bearings 32 near their lower ends. Adjacent to the housings 30 are arranged two parallel frames 33 formed with substantially triangular openings 34. The frames 33 are formed with the vertical slots 36 on their inner sides and in these slots is fitted, so as to slide vertically therein, a block 37 which is cut out on its upper end to form arms 38 that are transversely notched on top as shown at 39, the notches 39 forming bearing surfaces for the knife edges 40 of the scale beam 41. The block 37 has an opening 42 through which the end of the supplementary beam or lever 43 extends, the upper wall of the opening 42 being preferably of substantially V shape with a slightly rounded apex so as to afford a rocking surface at 44 against which the upper surface of the lever 43 bears as the block is moved up and down by the lever. The lever 43 is provided with a pivot 45 working in the bearings 32 of the housings 30 and the scale beam 41 carries a pivot 46 which at one position of the scale beam, that is the full line position in Fig. 3, rests on the bottoms of the slots 31 in the housings; this pivot 46 at this position of parts constituting the fulcrum of the scale beam, while the fulcrum of the scale beam when the parts are in the dotted line position is provided by the knife edges 40 and the bearings therefor on the block 37.

Within the posts or standards 25, 26, 27 and 28 is arranged a sliding carriage 47 and the ends of the scale beam 41 and the supplemental beam or lever 43 extend into an opening 48 in this carriage, the scale beam terminating in a rounded end 49 that rocks against a horizontally sliding bolt 49' carried in guides 50 in the block 37. The lever 43 is formed with a slot 51 and a pin 52 passes through the lugs 53 in the carriage 47 and the slot 51 and serves to connect the carriage and lever.

When it is desired to lower the carriage and thereby lower the ends of the scale beam and lever, this operation may be performed by hand and the carriage held down in its lowered position by a spring latch, but I prefer to lower the carriage by means of a drum 55 having a crank-handle 56, a ratchet wheel 57 and a dog 58, a cord 59 winding around the drum and connected to the carriage 47, serving to cause the lever to descend when the drum is revolved in one direction and allowing the lever to ascend when the drum is turned in the other direction.

In the modified form shown in Figs. 5 and 6 the carriage 47 is replaced by a carriage 61 and the carriage 61 has a cam 62 on its bottom that bears on top of the lever, the latter being connected to the carriage by a link 67 that extends through the slot 66 and in this form of my invention the sliding block 37 is dispensed with, the end of the lever 63 being forked and the forked end forming a bearing for the knife edges of the scale beam.

In other particulars than those above mentioned the parts are constructed and arranged in the modified form shown in Figs. 5 and 6 in the same manner as in the form shown in Figs. 3 and 4.

The operation of the apparatus shown in Figs. 1, 2, 3 and 4 is as follows: When the scale is inactive, that is when it is not in use, and also during the periods when the load is being placed on or being removed from the platform, the latter rests upon the I beams 6 which at this time act as the sole support for the platform, the scale beam 41 and the supplementary beam or lever 43 and the carriage 47 being at their elevated position, as shown in full lines in Fig. 3 and the levers of the weighing mechanism being in their lowermost position, the contact surfaces 9 of the platform being out of contact with the contact surfaces 10 of the weighing mechanism. The load to be weighed, say for instance, a railway car, is now placed upon the platform, the crank handle 56 is now turned, bringing down the carriage and with it the ends of the scale beam 41 and supplementary beam or lever 43 to the position shown in dotted lines in Fig. 3. During this period the block 37 is ascending and the knife edges of the scale beam are turning in the arc of a circle with the pivot of the scale beam as a center, the result of these movements will be that when the parts arrive at the position shown in dotted lines the knife edges exactly meet their bearings on top of the block. During the downward movement of the scale beam, the entire weight of the platform is sustained through the medium of the scale beam and the connections thereof with the weighing mechanism, by the pivot 46 which is at this time seated at the bottoms of the slots 41 in the housings 30, and, as the pivot is at some distance from the point of attachment of connection 20, the amount of movement of this connection and consequently the amount of movement of the mechanism is considerable and very much more than will be imparted to these parts during the weighing operation proper. After the scale beam and appurtenant parts have reached the dotted line position and when, as before described, the knife edges are touching their bearings on the block 37, the sliding bolt 49' is drawn out permitting the scale beam to assume a horizontal position as shown in dot and dash in Fig. 3, sudden ascent of the scale beam being prevented if deemed necessary by sliding the counterpoise weight 60 up to about a balancing position on the scale beam. As soon as the scale beam starts to ascend after the bolt 49' has been withdrawn, the fulcrum point of the scale beam is changed from the pivot 46 to the knife edges 40 and the knife edges consequently sustain the entire load from this time until the scale beam is returned to its dotted line position after the weighing operation has been completed.

The weighing operation is performed in the usual manner, after the scale beam has assumed the horizontal position by sliding the counterpoise along the scale beam until a perfect balance is obtained, the supplementary lever and carriage being meanwhile held down rigidly by the cord 59, the drum 55 being prevented from turning by the dog 58 engaging the ratchet wheel 57. While the carriage, the scale beam and the supplementary beam are being lowered, the levers of the weighing mechanism below the platform are being raised and at such rate that before the scale beam reaches the dotted line position, the contact surfaces of the weighing mechanism levers meet the contact surfaces of the platform and consequently, before the fulcrum point of the weighing scale has been changed from the pivot to the knife edge, the platform has been raised off the I beams and is sustained by the weighing levers and so remains while the fulcrum point is changing and during and after the weighing operation, until the fulcrum point has been returned from the knife edges to the pivot.

When the weighing has been accomplished, the scale beam is depressed to the dotted line position and held in place by returning the sliding bolt to its original position and then the carriage 47, which is light enough to be raised by the weight of the weighing mechanism below the platform, is allowed to rise by releasing the dog 58 from the ratchet wheel 57 and thereby permitting the drum 55 to revolve and the cord 59 to unwind from the drum, the fulcrum of the weighing lever changing during this from the knife edges to the pivot. As the carriage rises the platform descends and rests upon its stationary supports and after it has come to rest, the further upward movement of the carriage and the corresponding descent of the levers of the weighing mechanism carry these levers away from the platform and separate the bearing surfaces of the platform from the bearing surfaces of the levers of the weighing mechanism, thus entirely relieving the knife edges of the entire apparatus from any danger of injury and from unnecessary friction and wear, the weighing mechanism below the platform coming to its point of rest when the scale beam and the supplementary beam or lever have reached their highest position i. e., the position shown in full lines in Fig. 3.

The operation of the modified construction shown in Figs. 5 and 6 is similar in many respects to the operation of the construction shown in the other figures, the operation of which has been hereinbefore described in detail, that is to say, the carriage is raised and lowered and the weighing mechanism and platform are affected in the same manner in the modified construction but the movement of the scale beam and the supplementary beam or lever relatively to one another is somewhat different and I will now describe the same, reference being now had particularly to Figs. 5 and 6. In these figures the carriage which is designated 61, carries on its bottom a cam 62 of substantially triangular shape the oblique side joining the vertical side by a rounded corner, which corner constitutes the point of contact of the cam with the supplementary beam or lever which in these figures is designated 63. This supplementary beam or lever is pivoted in the housings 30 at 32 and is formed with an upturned and forked end 64, the upper end of the forked portion of the beam or lever being notched at 65 to provide a bearing for the knife edges of the scale beam 41. The scale beam in these figures is of the same construction as that in Figs. 1, 3 and 4 and is provided with the pivot 46 seating in the slots 31 in the housings and with the knife edges 40 which seat at one position of the scale beam, in the notches 65 of the supplementary beam or lever. The supplementary beam or lever 63 is formed with a slot 66 and a depending link 67 rigidly secured to the cam 62 passes through this slot and serves to connect the beam or lever with the cam and the carriage while permitting the lever to move longitudinally relatively to the cam.

The elevated position of the carriage, the scale beam and the supplementary beam or lever is shown in Fig. 3 in full lines and the depressed position of the same in dotted lines, while the scale beam is shown at the weighing position in dot and dash lines.

When in the elevated position the scale beam is sustained on the pivot and the knife edges are out of contact with the bearings on the supplementary lever and the bearing surfaces of the weighing mechanism levers, below the platform, are out of contact with the bearing surfaces of the platform.

When the weighing operation is to be performed, the crank handle 56 is turned and the carriage is drawn down, this movement bringing down the scale beam and the supplementary beam or lever. As the carriage descends the cam 62 acting on the supplementary beam or lever depresses the same and causes it to descend at a somewhat greater speed and consequently to a greater extent than the scale beam descends by the same movement, the result being that as the carriage descends the ends of the scale beam and lever connected to the carriage spread apart while the opposite ends approach until, when they have reached the dotted line position, the bearings on the forked end of the supplementary beam or lever meet the knife edges on the scale beam. The sliding bolt 49' is now drawn out and the scale beam ascends to the position indicated by the dot and dash lines, the fulcrum changing from the pivot to the knife edges, and the weighing operation is performed in the same manner as before described.

When the weighing operation has been performed, the scale beam is replaced in the position shown in dotted lines and the carriage is allowed to ascend by releasing the dog 58 thus allowing the platform to descend and to rest on its stationary supports and the bearing surfaces on the levers of the weighing mechanism below the platform to separate them from the bearing surfaces of the platform.

I claim:

1. In weighing scales the combination with a platform, stationary supports for the same and pivoted levers arranged below the platform and adapted to be brought into and out of contact with the same, of a scale beam connected to said levers, a vertically movable carriage connected to said scale beam and a pivoted supplementary beam or lever connected to said carriage, a vertically sliding block movable by said supplementary beam or lever, a stationary bearing, said scale beam being provided with a pivot adapted to engage a stationary bearing and knife edges adapted to engage said block, the engagement of the pivot and knife edges with the bearings being effected alternately by the ascent and descent of the scale beam and supplementary beam or lever.

2. In weighing scales, the combination with a platform, stationary supports for the platform, and weighing mechanism located below the platform and adapted to be moved into and out of operative connection with the platform, of a scale beam connected to said weighing mechanism and having two pivotal elements at different points of its length, a pivoted supplementary beam or lever carrying a bearing for one of the pivotal elements, a stationary bearing for the other of said pivotal elements, a vertically movable carriage connected to said scale beam and said supplementary beam or lever, and means for moving said carriage and holding the same in depressed position.

3. In weighing scales, the combination with a platform, stationary supports for the platform, and weighing mechanism adapted to be brought into and out of contact with the platform, of a scale beam connected to said weighing mechanism, a stationary bearing for said scale beam, a movable bearing for said scale beam, a pivoted supplementary beam or lever carrying said movable bearing, means for simultaneously moving the scale beam and supplementary beam or lever and transferring the fulcrum point of the scale beam from one to the other of said bearings.

4. In weighing scales the combination with a platform, stationary supports for the platform, and weighing mechanism adapted to be brought into and out of operative relation to the platform, of a scale beam connected to the weighing mechanism and having a plurality of fulcrums, a stationary bearing for one fulcrum, a movable bearing for the other fulcrum and means for bringing the said bearings into operation alternately.

5. In weighing scales, the combination with a platform, stationary supports for the platform, and weighing mechanism adapted to be brought into and out of contact with the platform, of a pivotally supported scale beam connected to said weighing mechanism and means for altering the pivotal point of support of the scale beam as the platform is raised from the said stationary supports.

In testimony whereof I affix my signature, in presence of two witnesses.

HENRY M. B. BARY.

Witnesses:
W. H. AUSTIN,
THOS. A. CONNOLLY.